Nov. 2, 1926.
J. A. NORDIN ET AL
WINDSHIELD CLEANER
Filed Jan. 2, 1923    2 Sheets-Sheet 1
1,605,137
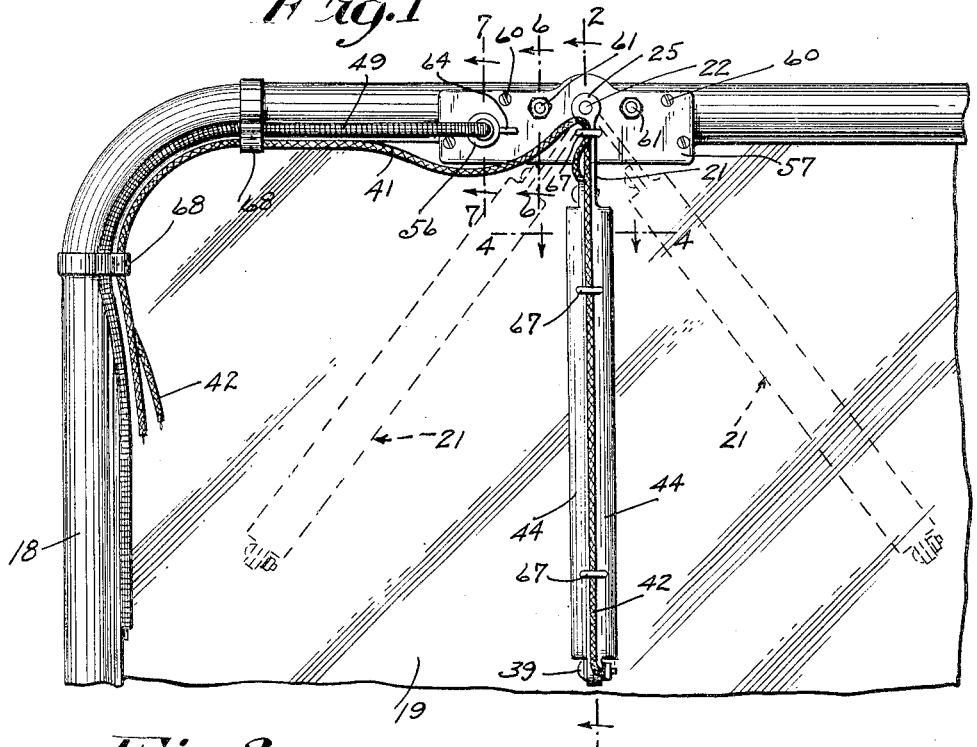
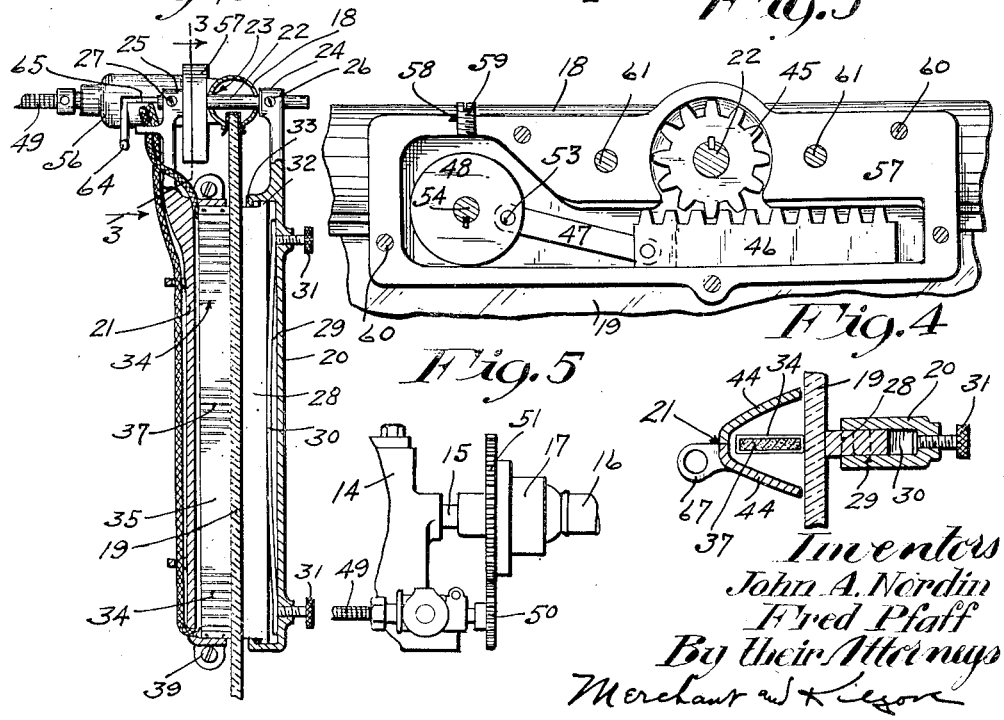
Inventors
John A. Nordin
Fred Pfaff
By their Attorneys Nov. 2, 1926.
J. A. NORDIN ET AL
WINDSHIELD CLEANER
Filed Jan. 2, 1923   2 Sheets-Sheet 2
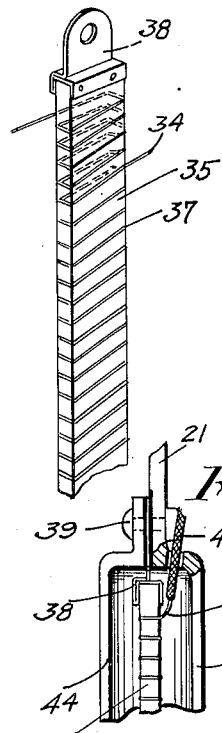
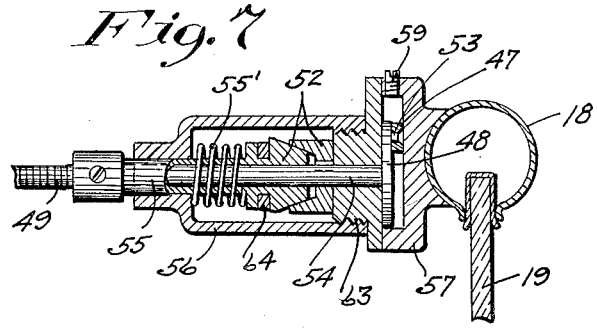
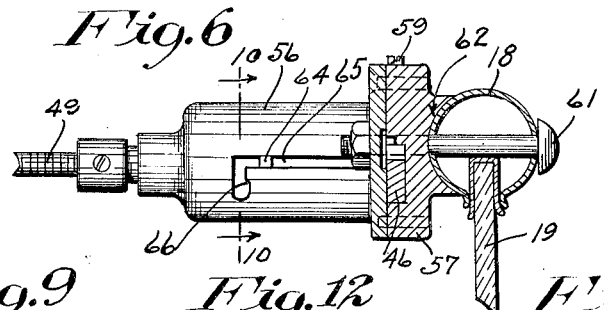
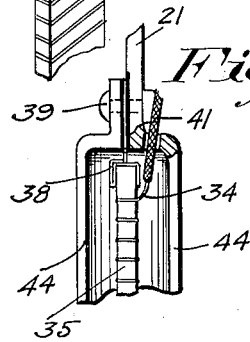
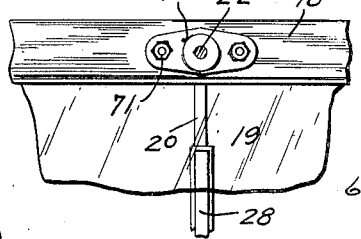
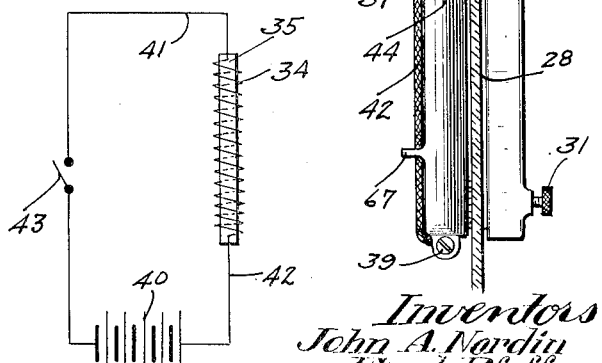
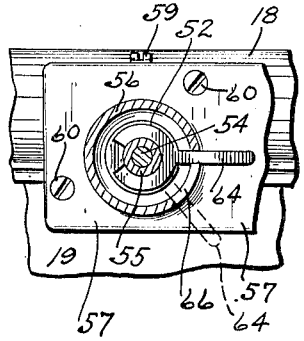
Inventors
John A. Nordin
Fred Pfaff
By their Attorneys
Merchant and Kilgore Patented Nov. 2, 1926.

1,605,137

UNITED STATES PATENT OFFICE.

JOHN A. NORDIN AND FRED PFAFF, OF MINNEAPOLIS, MINNESOTA.

WINDSHIELD CLEANER.

Application filed January 2, 1923. Serial No. 610,116.

Our invention relates to wind shield cleaners of the wiper type, and has for its object to cooperatively associate a heating element with a wind shield cleaner so that it will heat the surface of a wind shield engage by the cleaner.

During certain kinds of weather, wind shield cleaners now in use are not effective, for the reason that rain, sleet and snow will freeze thereon and the wiper will simply pass over the mass without removing the same. At other times steam, moisture or frost will accumulate on a wind shield and it is practically impossible to keep it sufficiently clear to give a distinct view.

By the use of our invention, sufficient heat may be applied to a certain portion of a wind shield to prevent rain, sleet or snow from freezing thereon before the same can be removed by the cooperating wiper. This heater will also prevent the accumulation of steam, moisture or frost on the heated area of the wind shield.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary inside elevation of a wind shield having the invention applied thereto, with the wiper shown in different positions by means of broken lines;

Fig. 2 is a view partly in elevation and partly in section taken on the line 2—2 of Fig. 1;

Fig. 3 is a detail view partly in elevation and partly in section taken on the line 3—3 of Fig. 2, on an enlarged scale;

Fig. 4 is a detail view principally in section taken on the line 4—4 of Fig. 1, on an enlarged scale;

Fig. 5 is a view in diagram showing one means of automatically operating the wind shield cleaner;

Fig. 6 is a view partly in elevation and partly in section taken on the line 6—6 of Fig. 1, on an enlarged scale;

Fig. 7 is a detail view principally in section taken on the line 7—7 of Fig. 1, on an enlarged scale;

Fig. 8 is a fragmentary perspective view of the heating element and its holder;

Fig. 9 is a fragmentary detail view of the heating element, holder and carrier arm therefor;

Fig. 10 is a detail view with some parts sectioned on the line 10—10 of Fig. 6;

Fig. 11 is a view corresponding to Fig. 2, but showing different means for operating the wind shield cleaner;

Fig. 12 is a fragmentary detail view with some parts sectioned on the line 12—12 of Fig. 11; and Fig. 13 is a wiring diagram.

The parts of an automobile to be noted are the engine casing 14, engine shaft 15, propeller shaft 16, universal joint 17, wind shield frame 18 and wind shield glass 19.

The numerals 20 and 21 indicate, respectively, an outer carrier arm and an inner carrier arm which extend on the same radial line from a short horizontal rock shaft 22 mounted in aligned bore-like seats 23 formed in the top member of the frame 18. These carrier arms 20 and 21 are adjustably secured to the rock shaft 22 by forming, on one of their ends, hubs 24 and 25, respectively, through which said shaft projects, and are adjustably secured thereto by set screws 26 and 27, respectively, which have screw-threaded engagement with said carrier arms. The carrier arms 20 and 21 are positioned on opposite surfaces of the glass 19 and are moved by rocking the shaft 22 parallel to the plane of said glass.

A rubber wiper blade 28 is mounted in a longitudinally extended channel 29 formed in the carrier arm 20 for wiping contact with the outer surface of the glass 19 and is yieldingly pressed thereagainst by a spring 30. This spring 30 is in the form of a bow, the intermediate portion of which bears against the inner edge of the wiper blade 28, and the ends of said spring are engaged by a pair of pressure screws 31, which have screw-threaded engagement with bossed openings in the back of the carrier arm 20. By adjusting the screws 31, the wiper blade 28 may be caused to engage the respective surface of the glass 19 with a variable pressure. To prevent the wiper blade 28 from dropping out of the slot 29, before the wind shield cleaner is applied to a wind shield, the ends of said wiper blade are provided with lugs 32 arranged to engage lugs 33 on the carrier arm 20 and which lugs 33 extend into the channel 29. In applying the wiper blade 28 in the channel 29 or removing the same therefrom, said wiper blade can be slightly bent or bowed to cause its lugs 32 to pass the lugs 33. The carrier arm 20 may be axially adjusted on the shaft 22 by loosening the set screw 26 to properly position the wiper blade 28 in respect to the glass 19, so that the spring 30 will be active.

To heat the surface of the glass 19 engaged by the wiper blade 28, a heating element 34 is mounted on a blade-like holder 35, which, in turn, is secured to the carrier arm 21. This heating element 34, as shown, is in the form of a resistance wire laid in a spiral groove 37 formed in the holder 35, which may be made from soapstone or other suitable material. The holder 35 is of substantially the same length as the wiper blade 28 and is secured, at its ends, by clips 38 to the carrier arm 21. Said carrier arm is longitudinally divided and the sections thereof connected by nut-equipped bolts 39 and the clips 38 extend between said sections and are perforated to receive the bolts 39 and thereby secure the clips 38 to the carrier arm 21. The clips 38 are made of relatively thin material and so arranged as to compensate for contraction and expansion The ends of the heating element 34 are connected to a battery 40 by lead wires 41 and 42, in the former of which is interposed controlling switch 43. Integrally formed with the carrier arm 21 is a pair of diverging wing-like deflectors 44 between which the heating element 34 extends. The holder 35 may engage the inner surface of the glass 19 for wiping-like action, or it may be just out of engagement therewith and the spiral groove in said holder will keep the heating element directly out of engagement with the glass, but closely positioned in respect thereto.

As one means for automatically operating the improved wind shield cleaner, the following driving connections are provided; a pinion 45, keyed to the rock shaft 22, intermeshing rack 46, connecting rod 47, crank actuating wheel 48 and a flexible shaft 49 having on one end a pinion 50 which meshes with a gear 51 secured to the member of the universal joint 17 on the engine shaft 15. The other end of the flexible shaft 49 is connected, at will, to the wheel 48 by a cone clutch 52, and the connecting rod 47 is attached to a wrist pin 53 on said wheel and connects the rack 46 thereto. The wheel 48 is keyed to a shaft 54 to which the fixed member of the clutch 52 is keyed and on which the movable member of said clutch is free to move axially into and out of engagement with said fixed member. The movable member of the clutch 52 is provided with a long sleeve-like hub 55, to which the flexible shaft 49 is directly secured, and which hub 55 is journaled in one end of a casing 56 and one end of the shaft 54 is journaled in said hub. The other end of the shaft 54 is journaled in a two-part housing 57 in which the pinion 45, rack 46, connecting rod 47 and wheel 48 are mounted and in which one end of the shaft 22 is journaled. A coiled spring 55', encircling the hub 55, is compressed between the movable member of the clutch 52 and the casing 56 and yieldingly holds the clutch set.

A lubricant for the movable parts in the housing 57 may be injected therein through an oil hole 58 normally closed by a screw plug 59. The sections of the housing 57 are connected by screws 60 and said housing is detachably secured to the upper member of the frame 18 by a pair of nut-equipped bolts 61 which extend through aligned bores in said housing and frame. The side of the housing 57, at the frame 18, is longitudinally grooved at 62 to receive said frame, which is round in cross-section, and if the frame is square or oval in cross-section, the housing 57 will have two-point contact therewith at the groove 62. The casing 56 is detachably secured to the housing 57 by screw threads, as indicated at 63. To move the movable member of the cone clutch 48 into a releasing position, there is provided a shipper lever 64 which works through a slot 65 formed in the casing 56 and having a lateral extension 66, which, when said lever is moved therein, locks the same in position to hold said movable clutch member in an inoperative position. The lead wires 41 and 42, outward of the carrier arm 21, are extended through eyes 67 formed with said arm to hold the same, and through clips 68 attached to the frame 18, and which clips also hold the flexible shaft 49.

From the above description, it is evident that, when the cone cluth 52 is set, the rock shaft 22 will be operated from the engine shaft 15 and thereby oscillate the carrier arms 20 and 21 in the plane of the glass 19, as indicated in Fig. 1, and at which time, the wiper blade 28 will keep the outer face of the glass 19 free from rain, sleet or snow, and the heating element 34 will heat that portion of the glass 19, engaged by the wiper blade 28, sufficiently to prevent freezing and the accumulation of steam, moisture and frost. To stop the action of the wind shield cleaner, it is only necessary to move the shipper lever 64 into the slot extension 66 to release the clutch, and by opening the switch 43 to cut off the current from the battery 40 to the heating element 34.

In Figs. 11 and 12, hand operated means is shown for rocking the shaft 22, and which means includes a hand crank 69 keyed to the rock shaft 22. In this form of wind shield cleaners, all of the driving connections, from the rock shaft 22 to the engine shaft 15, together with the casing 56 and housing 57, are dispensed with, and to afford a bearing for the rock shaft 22, in placing the housing 57, there is secured to the frame 18, a bearing 70 held in position by nut-equipped bolts 71.

While the invention is shown as described as a cleaner for wind shields, the same is well adapted for use in connection with street car and other windows, and the term wind shield is here used in a broad sense to cover any kind of a window.

In place of operating the wind shield wiper from the engine shaft, as shown, a motor or other power-actuated means may be provided if found more desirable.

What we claim is:

1. A windshield cleaner comprising opposed wipers adapted to engage opposite sides of the windshield glass, means for heating one of the wipers, said wipers being connnected and adapted to be mounted to swing simultaneously.

2. A windshield cleaner comprising a pad adapted to move across one face of the shield, an electric heater of similar conformation adapted to move over a portion of the other face, similar in extent to that cleaned by said pad, and means connecting said pad and heater whereby they are caused to move simultaneously, substantially as set forth.

3. The structure defined in claim 2 in further combination with a deflector for the heating element.

In testimony whereof we affix our signatures.

JOHN A. NORDIN.
FRED PFAFF.